US012000433B2

(12) United States Patent
Li et al.

(10) Patent No.: US 12,000,433 B2
(45) Date of Patent: Jun. 4, 2024

(54) MAGNETIC SUSPENSION BEARING DEVICE, COMPRESSOR AND METHOD OF ADJUSTING GAP OF CATCHER BEARING

(71) Applicant: Carrier Corporation, Palm Beach Gardens, FL (US)

(72) Inventors: Jiedong Li, Shanghai (CN); Chong Cao, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 172 days.

(21) Appl. No.: 17/839,750

(22) Filed: Jun. 14, 2022

(65) Prior Publication Data

US 2022/0403875 A1 Dec. 22, 2022

(30) Foreign Application Priority Data

Jun. 18, 2021 (CN) .......................... 202110677251.3

(51) Int. Cl.
*F16C 32/04* (2006.01)
*F04D 29/058* (2006.01)
(Continued)

(52) U.S. Cl.
CPC .......... *F16C 32/047* (2013.01); *F04D 29/058* (2013.01); *F16C 32/0402* (2013.01);
(Continued)

(58) Field of Classification Search
CPC .............. F16C 32/0402; F16C 32/0442; F16C 32/047; F16C 32/0485; F16C 32/0489;
(Continued)

(56) References Cited

U.S. PATENT DOCUMENTS 4,170,058 A 10/1979 Leffler
6,952,062 B1 * 10/2005 Mancl ...................... H02K 7/14
310/90

(Continued)

FOREIGN PATENT DOCUMENTS

CN 107035702 B * 10/2019 ................ C02F 7/00
CN 111404317 A 7/2020
EP 2784326 A1 * 10/2014 ............. F01D 25/16

OTHER PUBLICATIONS

European Search Reprt for application EP 22179760.8, dated Oct. 28, 2022, 34 pages.

*Primary Examiner* — Phillip A Johnson
(74) *Attorney, Agent, or Firm* — CANTOR COLBURN LLP (57) ABSTRACT

A magnetic suspension bearing device, a compressor and a method for adjusting catcher bearing gap. The magnetic suspension bearing device includes: a housing; a rotor in the housing; a magnetic bearing assembly between the housing and the rotor; a catcher bearing bracket mounted axially to an end of the housing, with a catcher bearing mounted at a radially inner side of the catcher bearing bracket; and a washer between the catcher bearing bracket and the end of the housing; wherein the washer includes a plurality of sub-washer portions, such that when the catcher bearing bracket is moved axially relative to the end of the housing to separate from the washer while still being supported by the end of the housing, the plurality of sub-washer portions can be radially removed and mounted.

11 Claims, 7 Drawing Sheets

(51) Int. Cl.
 *H02K 5/173* (2006.01)
 *H02K 7/09* (2006.01)
(52) U.S. Cl.
 CPC ...... *F16C 32/0442* (2013.01); *F16C 32/0489* (2013.01); *H02K 5/1732* (2013.01); *H02K 7/09* (2013.01); *F16C 2360/44* (2013.01)
(58) Field of Classification Search
 CPC . F16C 2360/44; F04D 29/058; H02K 5/1732; H02K 7/09
 See application file for complete search history.

(56) References Cited

U.S. PATENT DOCUMENTS

| | | | |
|---|---|---|---|
| 10,087,987 B2* | 10/2018 | Falomi | F16C 19/546 |
| 2008/0185928 A1* | 8/2008 | Buhler | F16C 3/02 |
| | | | 310/90.5 |
| 2009/0015012 A1* | 1/2009 | Metzler | F04D 29/058 |
| | | | 415/173.1 |
| 2014/0191604 A1* | 7/2014 | Hawkins | H02K 7/09 |
| | | | 310/90.5 |
| 2015/0244239 A1* | 8/2015 | Carrasco | F04D 25/06 |
| | | | 29/598 |

* cited by examiner

MAGNETIC SUSPENSION BEARING DEVICE, COMPRESSOR AND METHOD OF ADJUSTING GAP OF CATCHER BEARING

FOREIGN PRIORITY

This application claims priority to Chinese Patent Application No. 202110677251.3, filed Jun. 18, 2021, and all the benefits accruing therefrom under 35 U.S.C. § 119, the contents of which in its entirety are herein incorporated by reference.

TECHNICAL FIELD OF INVENTION

The present invention relates to the field of magnetic suspension bearings, in particular to a magnetic suspension bearing device and a compressor using the same.

BACKGROUND OF THE INVENTION

Magnetic suspension bearing mechanisms based on electromagnetic force are widely used in mechanisms such as compressors. In such bearing mechanisms, catcher bearings are often provided, the purpose of which is to prevent parts of the magnetic bearing from being damaged due to collision in the case of magnetic bearing failure. Therefore, a catcher bearing generally has a smaller gap than the magnetic bearing in the radial and axial directions, for example, the gap of the catcher bearing is often configured to be half of the gap of the magnetic bearing. In order to ensure that the gaps on both sides of the catcher bearing are equal, the axial position of the catcher bearing is often adjusted by washers of different thicknesses. However, the entire catcher bearing bracket needs to be disassembled when mounting the washer, which will bring tedious disassembly and installation steps.

SUMMARY OF THE INVENTION

The object of the present invention is to solve or at least alleviate the problems existing in the prior art.

According to one aspect, a magnetic suspension bearing device is provided, which comprises: a housing; a rotor in the housing; a magnetic bearing assembly between the housing and the rotor; a catcher bearing bracket mounted axially to an end of the housing, with a catcher bearing mounted at a radially inner side of the catcher bearing bracket; and a washer disposed axially between the catcher bearing bracket and the end of the housing; wherein the washer is composed of a plurality of sub-washer portions, such that when the catcher bearing bracket is moved axially relative to the end of the housing to separate from the washer while still being supported by the end of the housing, the plurality of sub-washer portions are capable of being radially removed and mounted.

Optionally, in an embodiment of the magnetic suspension bearing device, the catcher bearing bracket at its connecting portion with the end of the housing comprises an axial extension portion and a radial extension portion, and the plurality of sub-washer portions are disposed between the radial extension portion of the catcher bearing bracket and the end face of the end of the housing, wherein when the catcher bearing bracket is moved axially relative to the end of the housing to separate from the washer while still being supported by the end of the housing, the axial extension portion of the catcher bearing bracket remains engaged with the end of the housing such that the catcher bearing bracket is supported.

Optionally, in an embodiment of the magnetic suspension bearing device, the axial extension portion of the catcher bearing bracket is engaged with the radially inner side of the opening at the end of the housing.

Optionally, in an embodiment of the magnetic suspension bearing device, the radial extension portion of the catcher bearing bracket, the plurality of sub-washer portions and the end face of the end of the housing have openings at corresponding positions, so as to fix the catcher bearing bracket to the end of the housing by bolts.

Optionally, in an embodiment of the magnetic suspension bearing device, the end of the housing comprises an end cover having a central hole, wherein the axial extension portion of the catcher bearing bracket is inserted into the center hole of the end cover and is engaged with and supported by the radially inner side of the center hole, and the plurality of sub-washer portions are disposed between the radial extension portion of the catcher bearing bracket and the end face of the end cover.

Optionally, in an embodiment of the magnetic suspension bearing device, the catcher bearing bracket comprises a cover cap, and the cover cap at its connecting portion with the housing comprises an axial extension section and a radial extension section, wherein the axial extension section of the cover cap is inserted into the radially inner side of the open end of the housing, and the plurality of sub-washer portions are disposed between the radial extension section of the cover cap and the end face of the housing.

Optionally, in an embodiment of the magnetic suspension bearing device, wherein the magnetic bearing assembly comprises: a radial magnetic bearing assembly comprising: radial magnetic bearing rotor laminations sleeved on the outer side of the rotor, and a radial magnetic bearing stator portion disposed at the corresponding position on the inner side of the housing; and an axial magnetic bearing assembly comprising: a thrust disc sleeved on the outer race of the rotor, and an axial magnetic bearing stator portion disposed on the inner race of the housing and located axially on both sides of the thrust disc.

Optionally, in an embodiment of the magnetic suspension bearing device, the plurality of sub-washer portions comprises two, three or more circumferentially extending arc-shaped washer portions, wherein the central angles corresponding to the respective arc-shaped washer portions are the same.

Optionally, in an embodiment of the magnetic suspension bearing device, a catcher bearing bushing disposed on the rotor is further included, which comprises: a first bushing portion attached to the rotor before mounting of the catcher bearing bracket, and a second bushing portion attached to the rotor after mounting of the catcher bearing bracket, wherein the first bushing portion defines a first baffle wall located axially on a first side of the catcher bearing, and the second bushing portion comprises a second baffle wall located axially on a second side of the catcher bearing and an axial extension section.

According to another aspect, a compressor comprising the magnetic suspension bearing device according to the various embodiments is provided.

According to yet another aspect, a method for adjusting catcher bearing gap for use in the magnetic suspension bearing device according to the various embodiments is provided, which comprises: removing radially outward a plurality of sub-washer portions and replacing with a plurality of sub-washer portions of different thicknesses to adjust the gap of the catcher bearing when the catcher bearing bracket is moved axially relative to the end of housing to separate from the washer while still being supported by the end of the housing.

The axial position of the catcher bearing can be easily adjusted with the device and method according to the embodiments of the present invention.

BRIEF DESCRIPTION OF THE DRAWINGS

With reference to the accompanying drawings, the disclosure of the present invention will become easier to understand. Those skilled in the art would easily understand that these drawings are for the purpose of illustration, and are not intended to limit the protection scope of the present invention. In addition, in the figures, similar numerals are used to denote similar components, where.

DETAILED DESCRIPTION OF THE INVENTION

Figure 1:
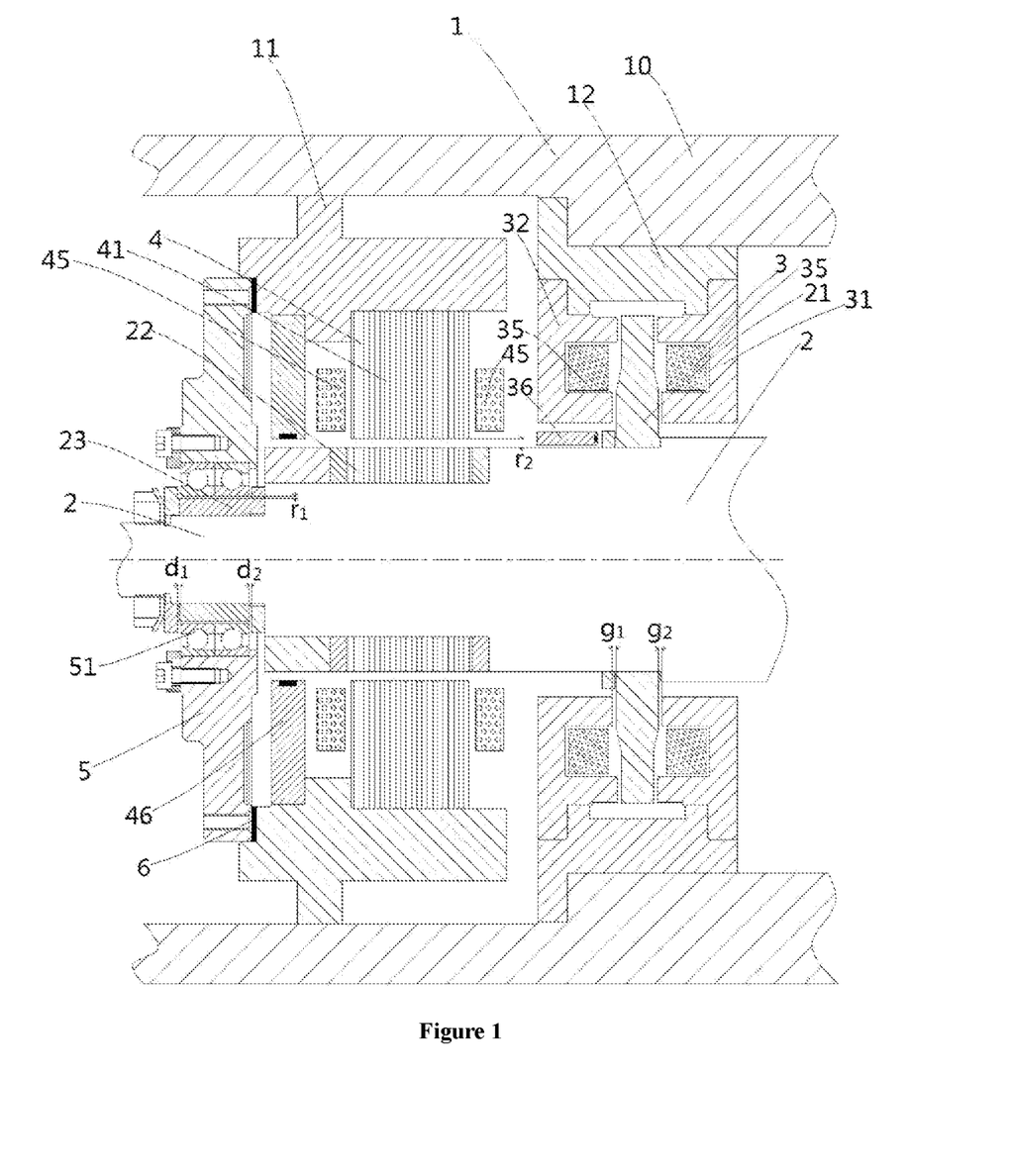
FIGS. 1 and 2 are longitudinal cross-sectional views showing a magnetic suspension bearing device in assembled and disassembled states.
Figure 2:
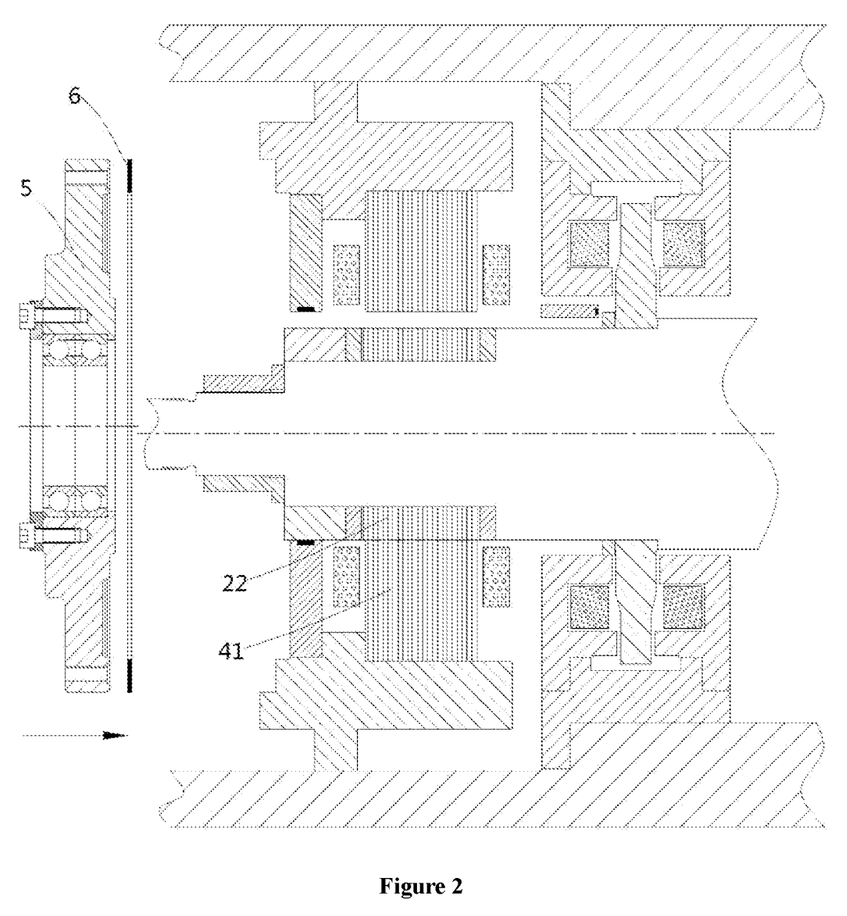

FIG. 1 is a longitudinal cross-sectional view at one end of a magnetic suspension bearing device. The magnetic suspension bearing device may comprises a housing 1 composed of a radial bearing shell 11, an axial bearing shell 12 and a general shell 10. A rotor 2 is disposed in the housing 1, and the rotor 2 is supported by a magnetic bearing assembly between the housing 1 and the rotor 2 when rotating. More specifically, the magnetic bearing assembly may comprise: a radial magnetic bearing assembly and an axial magnetic bearing assembly. The radial magnetic bearing assembly comprises: radial magnetic bearing rotor laminations 22 sleeved on the outer side of the rotor 2 and a radial magnetic bearing stator portion 4 disposed on the inner side of the radial bearing shell 11 of the housing 1 at a position corresponding to the rotor laminations 22. For example, the radial magnetic bearing rotor laminations 22 may comprise laminations and non-magnetic metal rings that compress the laminations, while the radial magnetic bearing stator portion 4 may comprise laminations 41 and windings 45 wound on the laminations 41. When the windings 45 are energized, a magnetic field can be generated to create an attraction force to the rotor laminations 22, thereby keeping the rotor radially suspended. The axial magnetic bearing assembly comprises: a thrust disk 21 sleeved on the outer race of the rotor 2 and an axial magnetic bearing stator portion 3 disposed on the inner race of the axial bearing shell 12 of the housing 1 and located axially on both sides of the thrust disk 21. The thrust disc 21 is made of, for example, a magnetic metal material, while the axial magnetic bearing stator portion 3 comprises brackets 31, 32 and windings 35 which are respectively disposed in the brackets 31, 32. When the windings 35 are energized, a magnetic field can be generated to create an attraction force to the thrust disk 21, thereby keeping the axial positions of the thrust disk 21 and the rotor 2. In addition, the magnetic bearing assembly also comprises a first sensor 46 for monitoring the radial bearing gaps r2 and a second sensor 36 for monitoring the axial bearing gaps g1, g2, and the currents in the windings 45, 35 can be adjusted according to the respective detected gaps, thereby keeping the rotor 2 as centered and stable as possible. Although only the structure at one end of the magnetic suspension bearing device is shown in the figure, it is conceivable that a radial magnetic bearing assembly may also be disposed at the other end of the rotor to provide radial support for the other end of the rotor 2. However, at the other end of the rotor 2, an axial magnetic bearing assembly may not exist, since one set of axial magnetic bearing assembly is sufficient for the axial limitation of the rotor 2. Furthermore, the magnetic suspension bearing device is also provided with a catcher bearing assembly, which comprises a bushing 23 on the rotor 2 and a catcher bearing 51 on the end cover 5. Under normal circumstances, a radial design gap r1 is provided between the catcher bearing 51 and the bushing 23, wherein the radial design gap r1 is smaller than a radial design gap r2 between the radial magnetic bearing rotor laminations 22 and the radial magnetic bearing stator portion 4, for example, r1=0.5r2. On the other hand, axial design gaps d1 and d2 are provided between the catcher bearing 51 and two baffle walls of the bushing 23 in the axial direction, wherein the axial design gaps d1 and d2 are smaller than design gaps g1 and g2 between the thrust disk 21 and the axial magnetic bearing stator portions 3 on both sides of the thrust disk 21, for example, d1+d2=0.5(g1+g2). In such case, when the radial or axial magnetic bearing assembly fails to function, the catcher bearing 51 will first come into contact with the bushing 23 to prevent collision and damage to the radial or axial magnetic bearing assembly. A washer 6 is disposed between the end cover 5 and the housing 1. By adjusting the thickness of the washer 6, the axial position of the catcher bearing 51 can be adjusted. It is desirable to select an appropriate thickness for the washer 6, so that when the actual gaps between the thrust disk 21 and the axial magnetic bearing stator portions 3 on both sides of the thrust disk 21 are the same, i.e., g1=g2, the actual gaps between the catcher bearing 51 and the two baffle walls of the bushing 23 in the axial direction are the same, i.e., d1=d2. This generally involves the following steps: mounting the reference washer, measuring the axially movable distance of the rotor 2, calculating the appropriate washer thickness, and removing the reference washer 6 and replacing it with a washer of the appropriate thickness. As shown in FIG. 2, in this design, since the washer 6 is a ring washer, if the washer needs to be replaced, the end cover 5 needs to be removed completely. At this time, the rotor 2, due to gravity and the magnetic pull force between the permanent magnet of the motor rotor and the motor stator, will be biased to one side, causing the magnetic bearing rotor laminations 22 to come into contact with the stator laminations 41. At this time, the shaft is off-center by a distance of about the radial design gap r2. However, after the washer is replaced, due to the magnetic pull force between the permanent magnet of the motor and the motor stator and the gravity of the rotor, it will be difficult to adjust the deviation distance r2 of the rotor 2 to be within the radial design gap r1 and remount the end cover 5. Normally, auxiliary tooling is required to achieve such remount.

Figure 3:
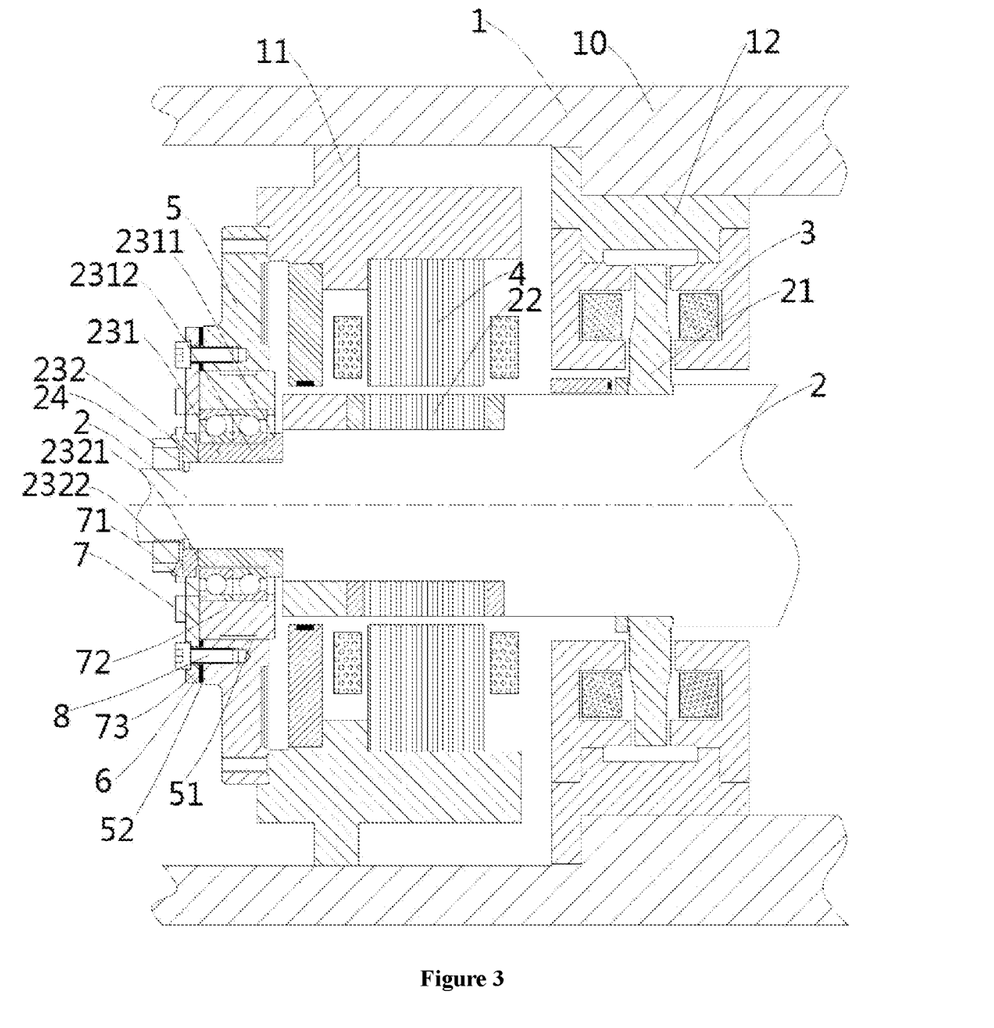
FIGS. 3 and 4 are longitudinal cross-sectional views showing a magnetic suspension bearing device according to an embodiment of the present invention in assembled and disassembled states.
Figure 4:
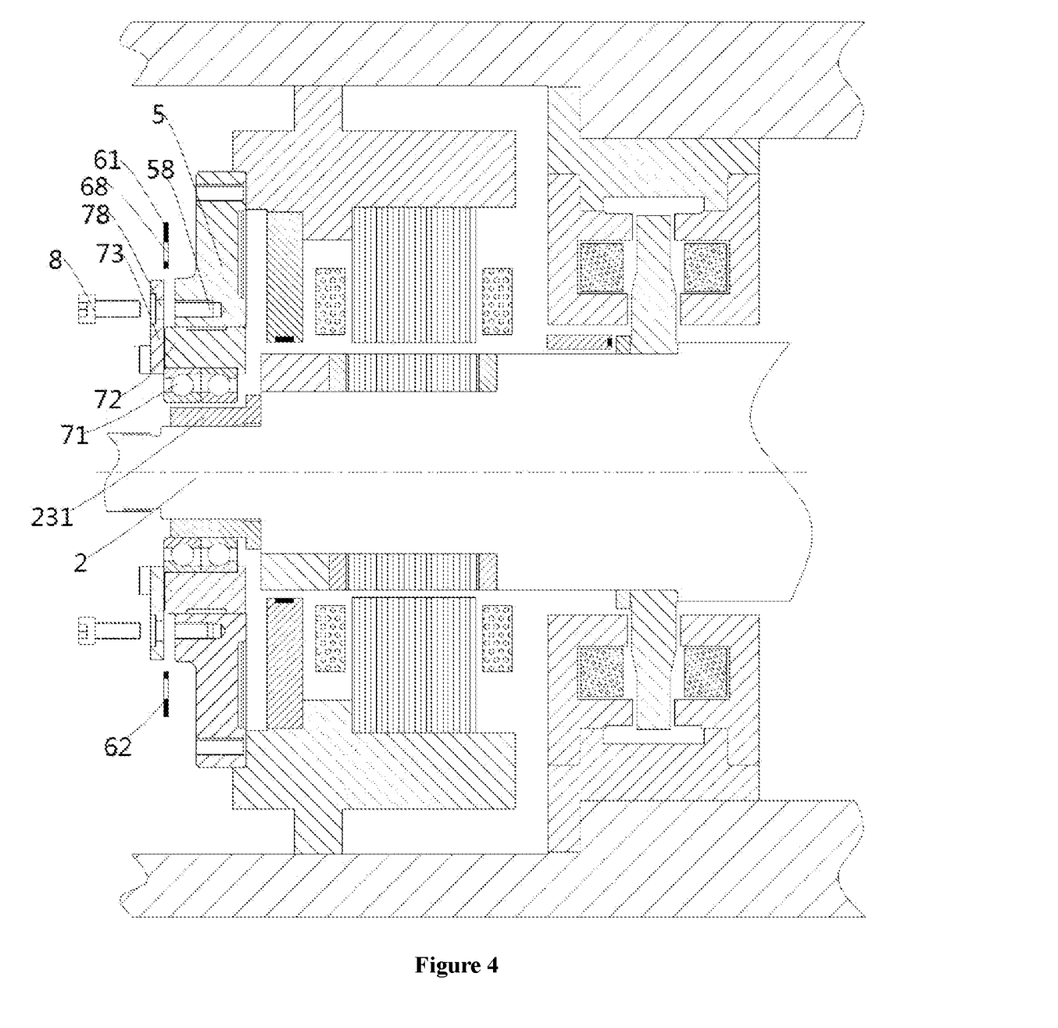
Figure 5:
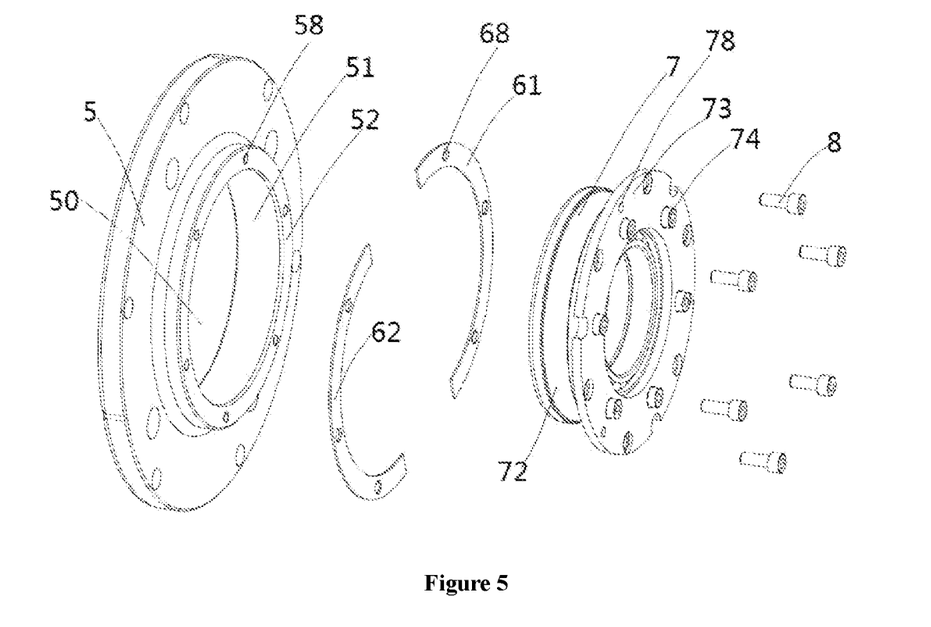
FIG. 5 is a perspective view of part of the components in FIGS. 3 and 4.

Referring now to FIGS. 3 to 5, a magnetic suspension bearing device according to an embodiment of the present invention will be introduced, wherein components having the same structure and function as those in FIG. 1 will not be introduced again. In the embodiment shown in FIG. 3, a catcher bearing bracket 7 is provided. In this embodiment, the end cover 5 is first mounted on the housing 1 to become the end portion of the housing 1, and the catcher bearing bracket 7 is axially mounted to the end of the housing (i.e., the end cover 5 in this embodiment). A catcher bearing 71 is mounted to the radially inner side of the catcher bearing bracket 7, and a washer 6 is axially disposed between the catcher bearing bracket 7 and the end of the housing. In this embodiment, the washer 6 is composed of a plurality of sub-washer portions 61, 62, so that as shown in FIG. 4, when the catcher bearing bracket 7 is moved axially relative to the end of the housing to separate from the washer 6 while still being supported by the end of the housing, the plurality of sub-washer portions 61, 62 can be removed radially outwards and mounted. With this arrangement, the washer can be replaced without completely disassembling the catcher bearing bracket 7, that is, the washer can be replaced when the rotor 2 is supported, thereby simplifying the steps of adjusting the gap of the catcher bearing and making the assembly process of the magnetic suspension bearing device easier.

In some embodiments, as can be best seen from FIG. 5, the catcher bearing bracket 7 at its connecting portion with the end of the housing comprises an axial extension portion 72 and a radial extension portion 73, wherein the radial extension portion 73 extends radially outward from the axially outer end of the axial extension portion 72. A plurality of sub-washer portions 61, 62 are disposed between the radial extension portion 73 of the catcher bearing bracket and the end face 52 of the end of the housing, i.e., the end cover 5. In some embodiments, when the catcher bearing bracket 7 is moved axially relative to the end of the housing to separate from the washer 6 while still being supported by the end of the housing (the state shown in FIG. 4), the axial extension portion 72 of the catcher bearing bracket remains engaged with the end of the housing so that the catcher bearing bracket 7 and thus the rotor 2 are supported. In the illustrated embodiment, the end cover 5 comprises a central hole 50, and the axial extension portion 72 of the catcher bearing bracket 7 is inserted into the central hole 50 of the end cover 5 and is engaged with and supported by the radially inner side 51 of the central hole 50. In some embodiments, the axial extension portion 72 and the radial extension portion 73 of the catcher bearing bracket 7 are connected together by bolts 74. In other embodiments, the two may be integrated or assembled in other ways. In some embodiments, as shown in FIGS. 4 and 5, the radial extension portion 73 of the catcher bearing bracket 7, the plurality of sub-washer portions 61, 62 and the end face 52 of the end of the housing have openings 78, 68, 58 at corresponding positions, so as to fix the catcher bearing bracket 7 to the end cover 5 at the end of the housing by means of bolts 8. The bolts 8 are disposed substantially axially, and fix the respective sub-washer portions 61, 62. A total of six bolts 8 are shown in the illustrated embodiment, which are distributed evenly around the circumference. Bolts of different numbers may be provided in alternative embodiments. In addition, when replacing the washer, it is first needed to remove these bolts 8, and then move the catcher bearing bracket 7 in the axial direction until the catcher bearing bracket 7 is in a state of being loosened from the end of the housing but not separated from it, as shown in FIG. 4, wherein the washer 6 can be easily replaced. In some embodiments, the plurality of sub-washer portions may comprise two, three or more circumferentially extending arc-shaped washer portions, wherein the central angles corresponding to the respective arc-shaped washer portions are the same. For example, the sub-washer portions 61, 62 in FIG. 5 can each extend approximately 180 degrees circumferentially. In the case of three sub-washer portions, each sub-washer portion can extend 120 degrees circumferentially, etc. In alternative embodiments, the sub-washer portions may correspond to different central angles, or the sub-washer portions may not necessarily extend the entire circumference when assembled.

In some embodiments, the catcher bearing bushing comprises: a first bushing portion 231 attached to the rotor before mounting of the catcher bearing bracket 7 and a second bushing portion 232 attached to the rotor after mounting of the catcher bearing bracket 7. The first bushing portion 231 defines a first baffle wall 2311 located axially on the first side of the catcher bearing and having an axial extension section 2312. The second bushing portion 232 comprises a second baffle wall 2322 located axially on the second side of the catcher bearing and having an axial extension section 2321. By adjusting the length of the axial extension section 2321 of the second bushing portion 232, the designed axial gap of the catcher bearing can be adjusted. For example, for different equipment, different clients or different criteria and requirements, second bushing portions 232 having different axial extension section 2321 lengths may be used.

Figure 6:
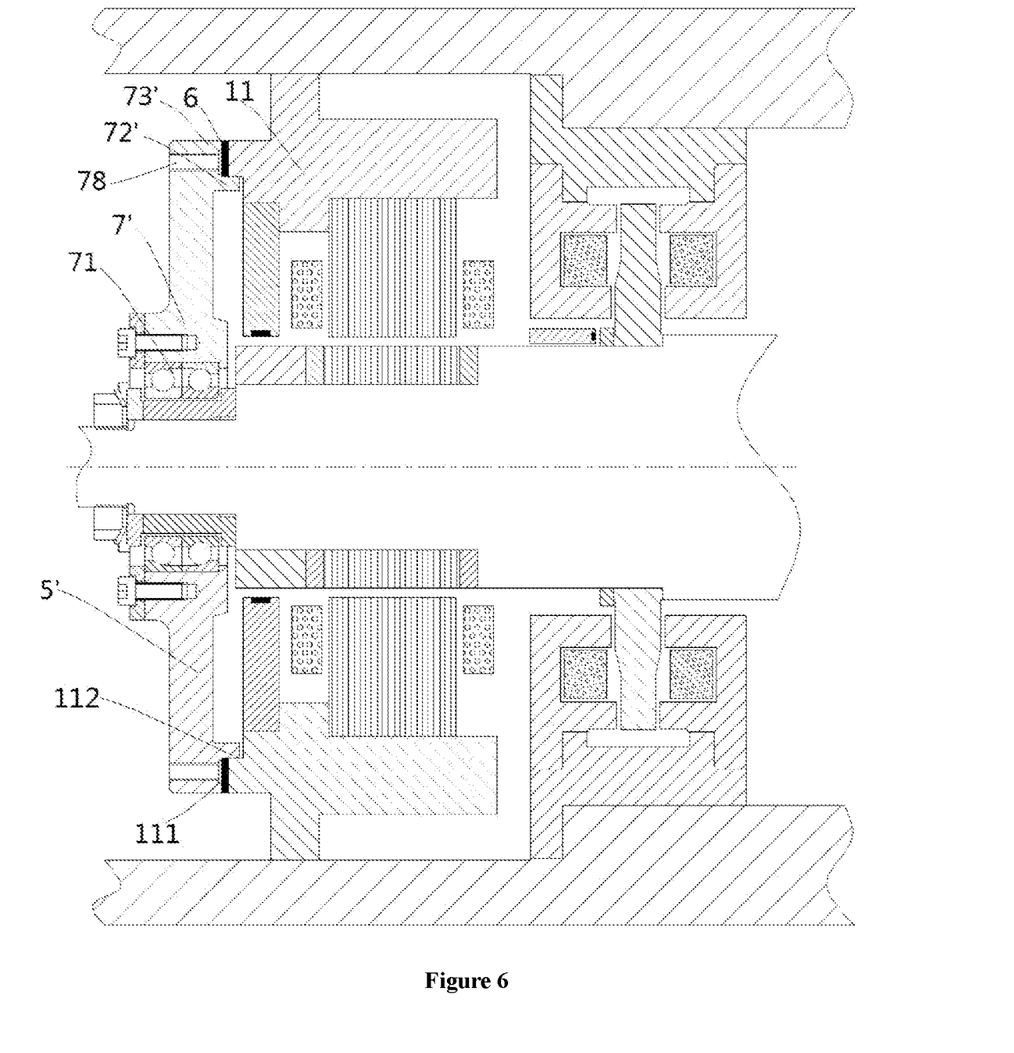
FIGS. 6 and 7 are longitudinal cross-sectional views showing a magnetic suspension bearing device according to another embodiment of the present invention in assembled and disassembled states.
Figure 7:
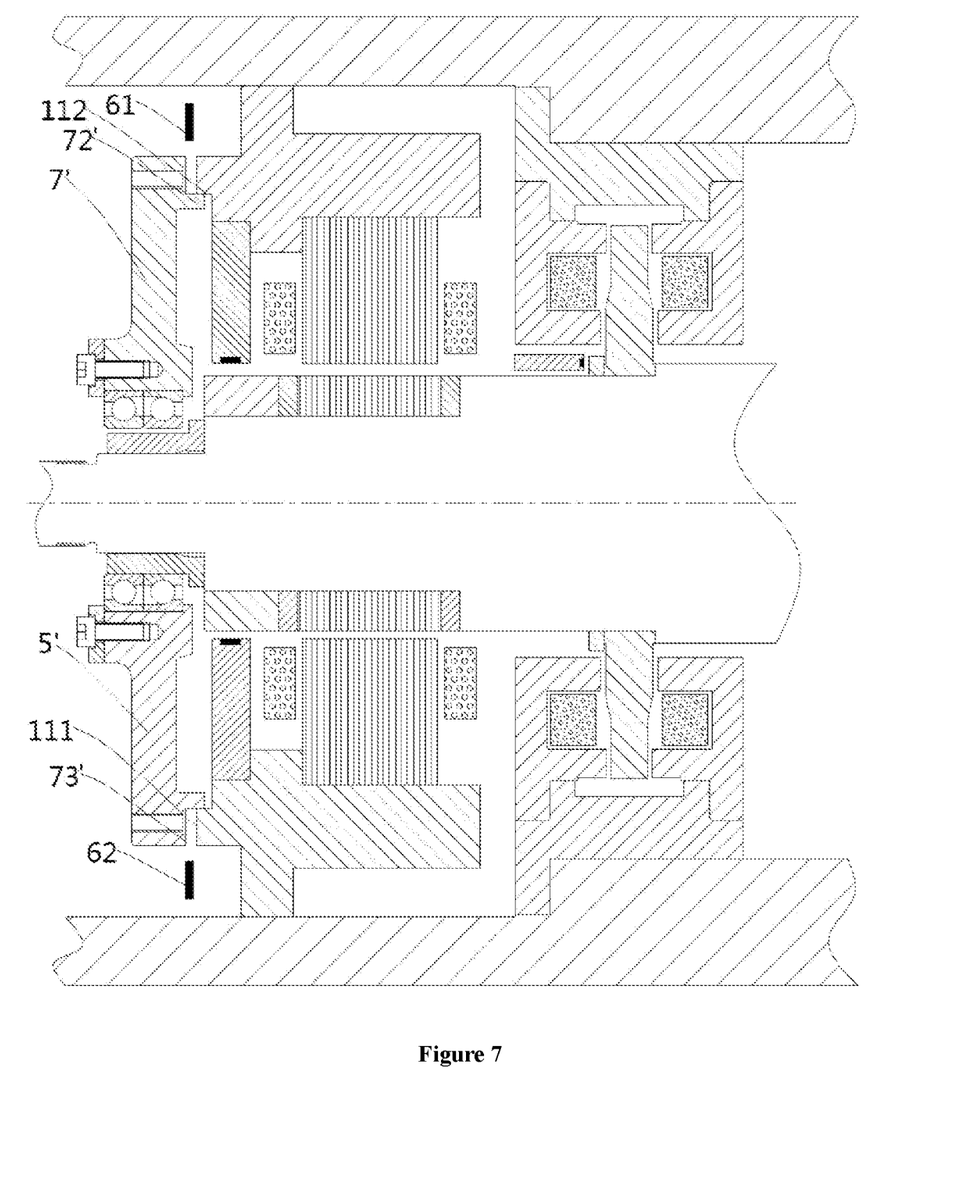

With continued reference to FIGS. 6 and 7, in this embodiment, the cover cap 5' is integrated into the catcher bearing bracket 7'. In other words, the catcher bearing bracket 7' includes the cover cap 5', while the cover cap portion of the catcher bearing bracket 7' is connected to the housing 1, such as the radial bearing shell 11 of the housing 1. The connecting portion of the catcher bearing bracket 7' with the housing 1 is designed at the cover cap 5', which comprises an axial extension section 72' and a radial extension section 73'. The axial extension section 72' of the cover cap 5' is inserted into the radially inner side of the open end of the housing to be engaged with the inner side surface 112 of its opening, and a plurality of sub-washer portions 61, 62 are disposed axially between the radial extension section 73' of the cover cap 5' and the end face 111 of the housing. As shown in FIG. 7, similarly, in the case where the catcher bearing bracket 7' is moved relative to the end of the housing to separate from the washer while still being supported by the end of the housing, the washer 6 can be removed radially outwards and replaced with a washer 6 having a different thickness. At this time, by engaging the axial extension section 72' with the inner side surface of the opening at the end of the housing, the catcher bearing bracket 7' is supported, and thus the rotor 2 is supported, so as to facilitate the replacement of the washer and adjustment of the axial position of the catcher bearing.

In addition, a compressor comprising the magnetic suspension bearing device according to the various embodiments is also provided. Furthermore, a method for adjusting catcher bearing gap for use in the magnetic suspension bearing device according to the various embodiments is further provided, which comprises: removing radially outward a plurality of sub-washer portions and replacing with a plurality of sub-washer portions of different thicknesses to adjust the gap of the catcher bearing when the catcher bearing bracket is moved axially relative to the end of housing to separate from the washer while still being supported by the end of the housing.

The specific embodiments described above are merely intended to describe the principles of the present invention more clearly, wherein various components are clearly shown or described to facilitate the understanding of the principles of the present invention. Those skilled in the art may, without departing from the scope of the present invention, make various modifications or changes to the present invention. Therefore, it should be understood that these modifications or changes should be included within the scope of patent protection of the present invention.

What is claimed is:

1. A magnetic suspension bearing device, comprising:
   a housing;
   a rotor in the housing;
   a magnetic bearing assembly between the housing and the rotor;
   a catcher bearing bracket mounted axially to an end of the housing, with a catcher bearing mounted at a radially inner side of the catcher bearing bracket; and
   a washer disposed axially between the catcher bearing bracket and the end of the housing;
   wherein the washer is composed of a plurality of sub-washer portions, such that when the catcher bearing bracket is moved axially relative to the end of the housing to separate from the washer while still being supported by the end of the housing, the plurality of sub-washer portions are capable of being radially removed and mounted.

2. The magnetic suspension bearing device according to claim 1, wherein the catcher bearing bracket at a connecting portion with the end of the housing comprises an axial extension portion and a radial extension portion, and the plurality of sub-washer portions are disposed between the radial extension portion of the catcher bearing bracket and an end face of the end of the housing, wherein when the catcher bearing bracket is moved axially relative to the end of the housing to separate from the washer while still being supported by the end of the housing, the axial extension portion of the catcher bearing bracket remains engaged with the end of the housing such that the catcher bearing bracket is supported.

3. The magnetic suspension bearing device according to claim 2, wherein the axial extension portion of the catcher bearing bracket is engaged with a radially inner side of an opening at the end of the housing.

4. The magnetic suspension bearing device according to claim 2, wherein the radial extension portion of the catcher bearing bracket, the plurality of sub-washer portions and the end face of the end of the housing have openings at corresponding positions, so that the catcher bearing bracket is fixed to the end of the housing by bolts.

5. The magnetic suspension bearing device according to claim 2, wherein the end of the housing comprises an end cover having a central hole, wherein the axial extension portion of the catcher bearing bracket is inserted into the center hole of the end cover and is engaged with and supported by the radially inner side of the center hole, and the plurality of sub-washer portions are disposed between the radial extension portion of the catcher bearing bracket and the end face of the end cover.

6. The magnetic suspension bearing device according to claim 2, wherein the catcher bearing bracket comprises a cover cap, and the cover cap at the connecting portion with the housing comprises the axial extension section and the radial extension section, wherein the axial extension section of the cover cap is inserted into the radially inner side of the open end of the housing, and the plurality of sub-washer portions are disposed between the radial extension section of the cover cap and the end face of the housing.

7. The magnetic suspension bearing device according to claim 1, wherein the magnetic bearing assembly comprises:
   a radial magnetic bearing assembly comprising: radial magnetic bearing rotor laminations sleeved on an outer side of the rotor, and a radial magnetic bearing stator portion disposed at a corresponding position on an inner side of the housing; and
   an axial magnetic bearing assembly comprising: a thrust disc sleeved on an outer race of the rotor, and an axial magnetic bearing stator portion disposed on an inner race of the housing and located axially on both sides of the thrust disc.

8. The magnetic suspension bearing device according to claim 1, wherein the plurality of sub-washer portions comprise two, three or more circumferentially extending arc-shaped washer portions, wherein the central angles corresponding to the respective arc-shaped washer portions are the same.

9. The magnetic suspension bearing device according to claim 1, further comprising a catcher bearing bushing disposed on the rotor, wherein the catcher bearing bushing comprises: a first bushing portion attached to the rotor before mounting of the catcher bearing bracket and a second bushing portion attached to the rotor after mounting of the catcher bearing bracket, wherein the first bushing portion defines a first baffle wall located axially on a first side of the catcher bearing, and the second bushing portion comprises a second baffle wall located axially on a second side of the catcher bearing and an axial extension section.

10. A compressor, wherein the compressor comprises the magnetic suspension bearing device according to claim 1.

11. A method for adjusting catcher bearing gap for use in the magnetic suspension bearing device according to claim 1, comprising: removing radially outward a plurality of sub-washer portions and replacing with a plurality of sub-washer portions of different thicknesses to adjust the gap of the catcher bearing when the catcher bearing bracket is moved axially relative to an end of the housing to separate from the washer while still being supported by the end of the housing.

* * * * *